United States Patent

Park et al.

[11] Patent Number: 5,912,884
[45] Date of Patent: Jun. 15, 1999

[54] OVERLOAD CELL CONTROL METHOD IN A CDMA MOBILE SYSTEM

[75] Inventors: Woo Goo Park; Sook Jin Lee, both of Taejon-Shi; Jee Hwan Ahn, Kongju-Shi, all of Rep. of Korea

[73] Assignee: Electronics and Telecommunications Research Institute, Daejeon, Rep. of Korea

[21] Appl. No.: 08/796,024

[22] Filed: Feb. 5, 1997

[30] Foreign Application Priority Data

May 2, 1996 [KR] Rep. of Korea ................. 96-14318

[51] Int. Cl.[6] ................. H04J 13/00; H04B 7/216
[52] U.S. Cl. ................. 370/331; 370/335; 370/342; 455/453; 455/436; 455/449; 455/522
[58] Field of Search ................. 370/252, 328, 370/329, 331, 335, 341, 342, 441; 455/446, 453, 522, 436, 422, 449

[56] References Cited

U.S. PATENT DOCUMENTS

| | | | |
|---|---|---|---|
| 5,241,685 | 8/1993 | Bodin et al. | 455/453 |
| 5,448,621 | 9/1995 | Knudsen | 455/453 |
| 5,649,293 | 7/1997 | Reed | 455/453 |
| 5,666,356 | 9/1997 | Fleming et al. | 370/328 |
| 5,754,959 | 5/1998 | Ueno et al. | 455/453 |
| 5,787,344 | 7/1998 | Scheinert | 455/422 |

OTHER PUBLICATIONS

A Novel Adaptive Traffic Load Shedding Scheme for CDMA Cellular Mobile Systems; X.H. Chen and Caleb Joshua Lee K.L.; pp. 566–570; 1994.

*Primary Examiner*—Chi H. Pham
*Assistant Examiner*—Ricky Ngo
*Attorney, Agent, or Firm*—Antonelli, Terry, Stout & Kraus, LLP

[57] ABSTRACT

The method for controlling an overload cell in a CDMA Mobile System comprises the steps of: a first step of receiving information on the overload cell from an overload detection module within a base station controller to retrieve the information on the load of neighboring cells and calculating the information on the total overload of neighboring cells; a second step of determining whether or not the total overload of the neighboring cell in a second hierarchy is greater than the maximum value of the neighboring cells; a third step of informing the overload detection module of the impossibility of control and terminating the procedure when it is determined that the total overload of the neighboring cell in the second hierarchy is not greater than the maximum value of the neighboring cells; a fourth step of retrieving a cell group as a third hierarchy with minimum load when at the second step it is determined that the total overload of the neighboring cell in the second hierarchy is greater than the maximum value of the neighboring cells; and a fifth step of increasing forward power of the cell with minimum load to expand a service region and handoffing a moving subscriber call in the vicinity of the neighboring cell of the overload cell to the expanded cell.

5 Claims, 4 Drawing Sheets

BEFORE OVERLOAD CONTROL

AFTER OVERLOAD CONTROL

FIRST LAYER

SECOND LAYER

THIRD LAYER

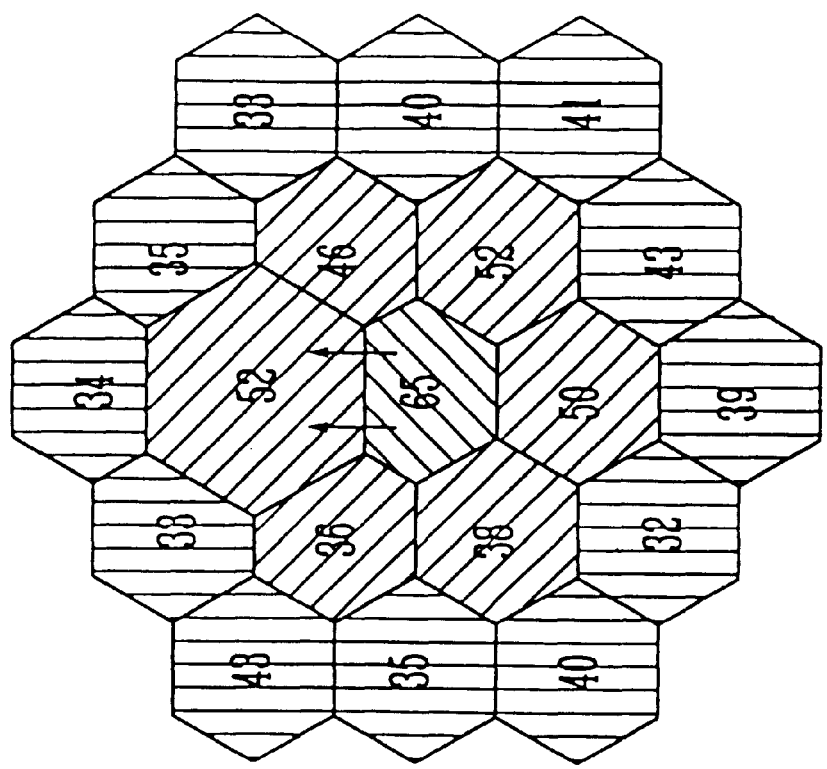
FIG. 3B — AFTER OVERLOAD CONTROL
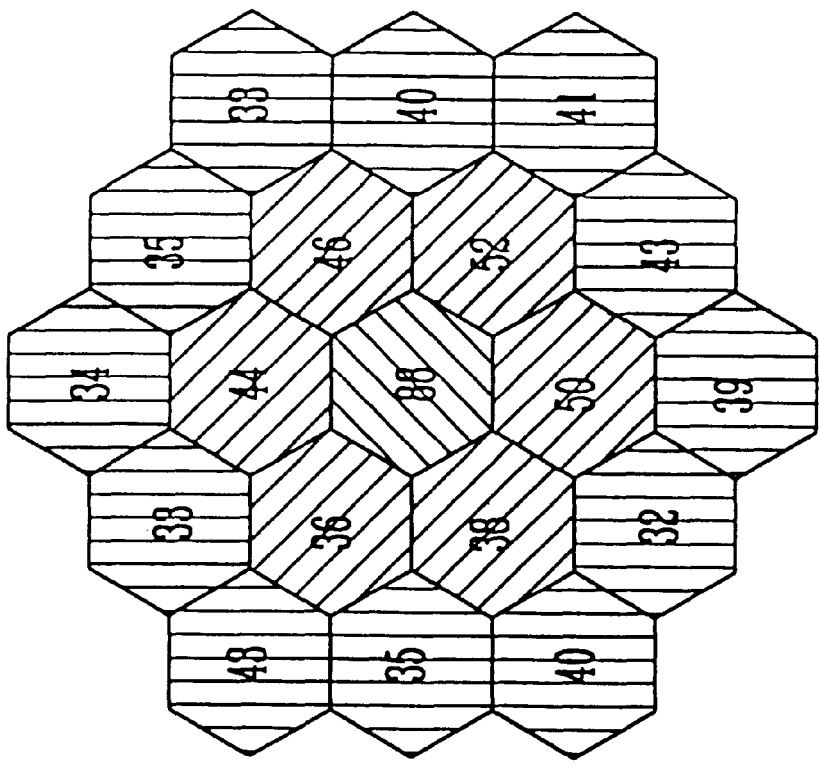
FIG. 3A — BEFORE OVERLOAD CONTROL

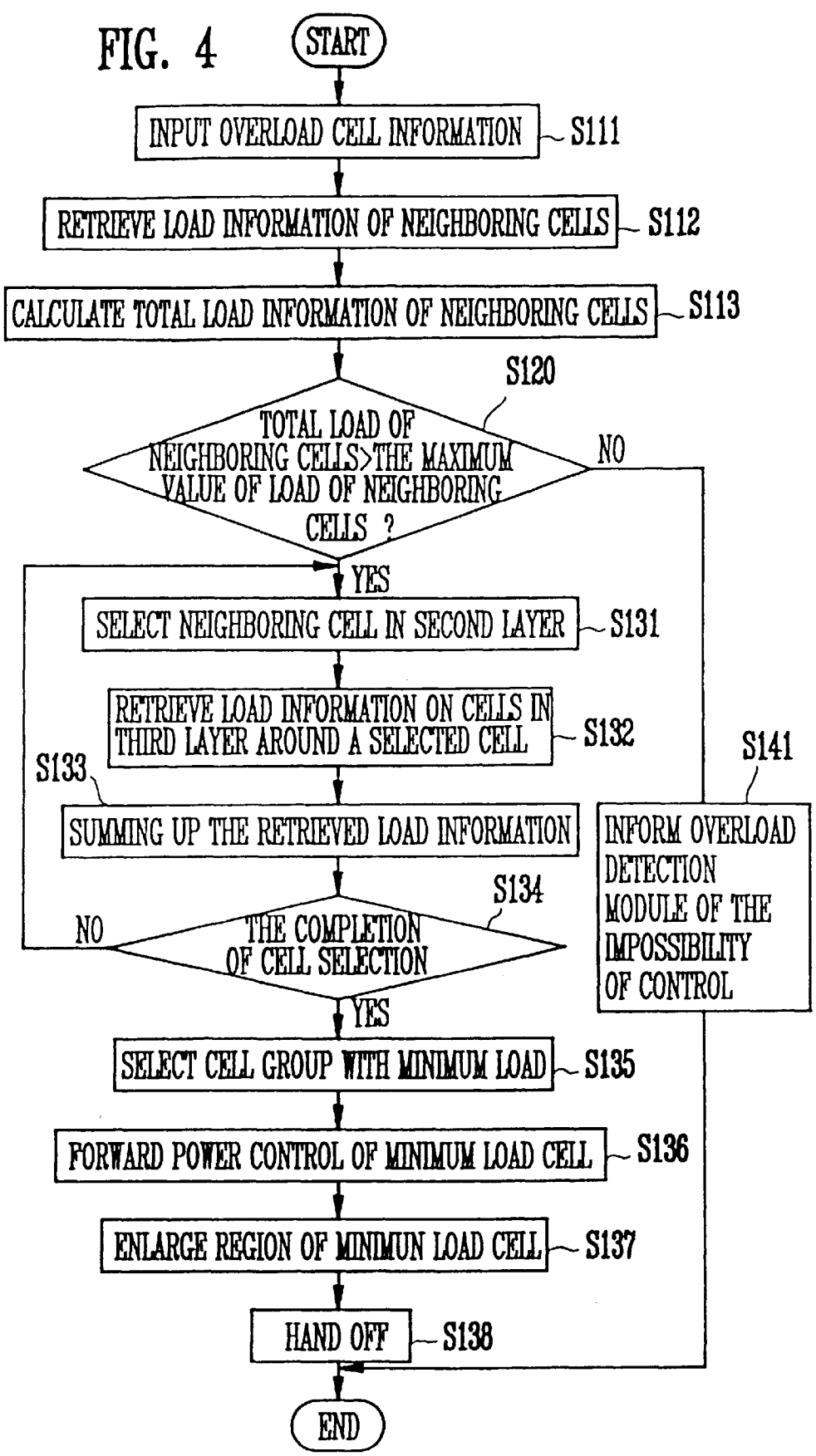

OVERLOAD CELL CONTROL METHOD IN A CDMA MOBILE SYSTEM

BACKGROUND OF THE INVENTION

1. Field of the Invention

This invention relates to a method for controlling an overload cell in a CDMA Mobile System, and more particularly to a method for controlling an overload cell using a selection of a minimum load cell group in a CDMA Mobile System. Here, the term "cell group" is said to be cells around a certain cell.

2. Description of the Prior Art

In general, the CDMA Mobile System (referred to "CMS" hereinafter simply) is a Mobile Communication System, based on a stored program control system, and a system in which processors are provided hierarchically. A base station controller controls a number of base transceiver subsystems. The base station controller and the base transceiver system can induce an overload due to a great quantity of calls generated therein. In this case, a prior art method controls the overload only for the base station controller when the overload is detected in the base station controller. However, because such a method cannot control in advance calls generated in cells according to an overflow of calls, reduction of a channel resource, and increase in load of a processor in multiple cells, there is a problem in that the operation of the CMS is difficult.

Accordingly, there is a need for a method for controlling an overload of the cell which belongs to the base station controller on the part of the base station controller.

SUMMARY OF THE INVENTION

In view of the foregoing problem, it is an object of the present invention to improve the overall efficiency of a radio communication network by dispersing a cells overload generated in multiple cell which belongs to a base station controller around a cell group with minimum load in the vicinity of a particular overloaded cell using a hierarchical structure of the cell so that the cell overload is alleviated.

It is another object of the present invention to increase the performance and capacity of the base station controller by handingoff a call of an overloaded cell to a expanded neighboring cell with minimum load to thereby disperse the load involved in the overloaded cell into the neighboring cell with minimum load so that the overload is prevented in advance from adversely affecting the entire system.

In order to accomplish the objects, according to the present invention, a method for controlling an overload cell in a CDMA Mobile System comprises the steps of: receiving information regarding the overload cell from an overload detection module within a base station controller to retrieve the information regarding the load of neighboring cells and calculate the information on the total overload of a neighboring cells; comparing whether the predetermined total overload of the neighboring cells with a total load of the neighboring cells; informing the overload detection module of the impossibility of control when it is determined that the total overload of the neighboring cells is not greater than the total load of the neighboring cells; retrieving a cell group having minimum load when at the second step it is compared that the total overload of the neighboring cells is less than the total load of the neighboring cells; and increasing forward power of the cell having minimum load to expand a service region and handoffing a moving subscriber call in the vicinity of the neighboring cells of the overload cell to the expanded cell.

BRIEF DESCRIPTION OF THE DRAWINGS

The present invention will be more clearly understand from the following description by way of the preferred embodiment with reference to the accompanying drawings, wherein;

FIGS. 3A and 3B are exemplary views for explaining the controlling of the relationship between an overload cell and a minimum load cell.

FIG. 4 is a flowchart for controlling the overload in the overload cell.

DETAILED DESCRIPTION OF THE PREFERRED EMBODIMENT

Hereinafter, the present invention will be explained by way of an embodiment with reference to the accompanying drawings.

Figure 1:
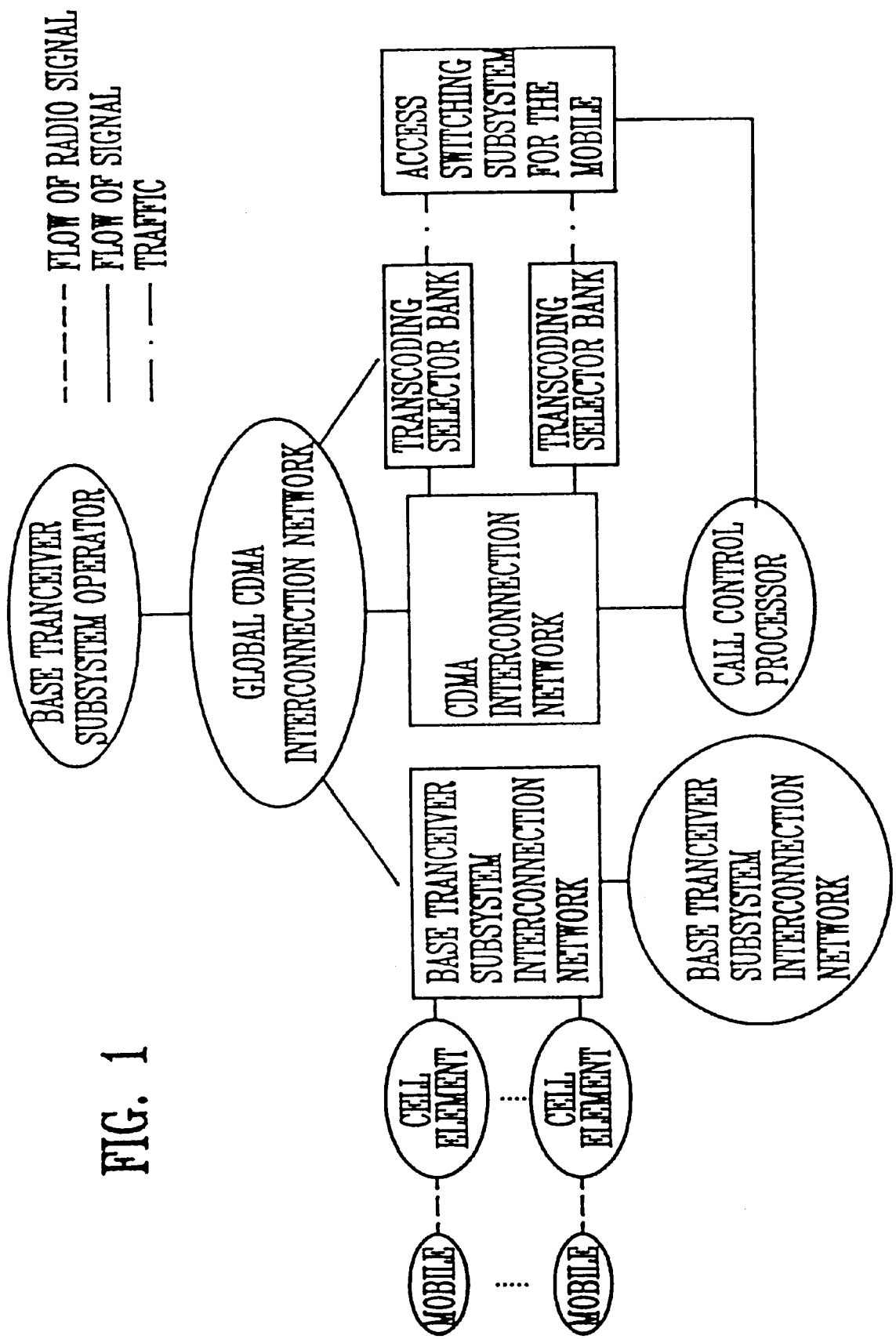
FIG. 1 is a structure of a base station system in a CDMA mobile communication system according to the present invention.

FIG. 1 shows a structure of a base station system in a CDMA mobile communication system.

CMS is composed of a base station manager (referred to "BSM" hereinafter simply), a controller, a base transceiver subsystem, a mobile station, and mobile telephone switch office, etc,.

One BSM controls 12 base station controllers and performs the operation and maintenance of the base station controller and the base transceiver subsystem.

One base station controller has a cell control processor (hereinafter referred to "CCP" simply) and 32 selector interface module (hereinafter referred to "SIM" simply) and is in charge of the wire and wireless link control signals and the control of the calls.

A CIN (CDMA Interconnection Network) of the base station controller provides a communication path through packet data transmission between the BSM and base station controller and the base transceiver subsystem.

The SIM is composed of a selector interface processor (hereinafter referred to as "SIP") and a selector vocoding processor (hereinafter referred to as "SVP"), etc.

One base station controller accommodates 32 base transceiver subsystems and 32 SIPs at the maximum and each of SIPs can be connected with 4 SVPs at the maximum.

The base transceiver subsystems are connected with the base station controllers via a link and route or transceive the control information and the traffic information of the mobile station through interaction.

In addition, each of base station controller connects CIN in each of base station controller with four groups of CIN to form a base station controller network.

In addition, a base transceiver subsystem call processor (hereinafter referred to "BCP" simply) in the base transceiver subsystem controls a call in cooperation with CCP within the base station controller.

As described above, the base station controller and the base transceiver subsystem are formed to have the hierarchy of different processors.

The generation of a call opens at the base transceiver subsystem, and the registration of location, paging and the process of a call concentrate in the base station controller.

A radio communication network allows the load of the network to be minimized by controlling the load of each cell uniformly.

A center cell of a cell group with minimum load among surrounding cell groups expands the radius of a cell by a forward power control. In other words, the probability of the regeneration of overload in a selected cell group due to the handoff will be lowest by retrieving a neighboring cell group in the vicinity of a cell with overload and selecting a cell group with a minimum load.

Figure 2:
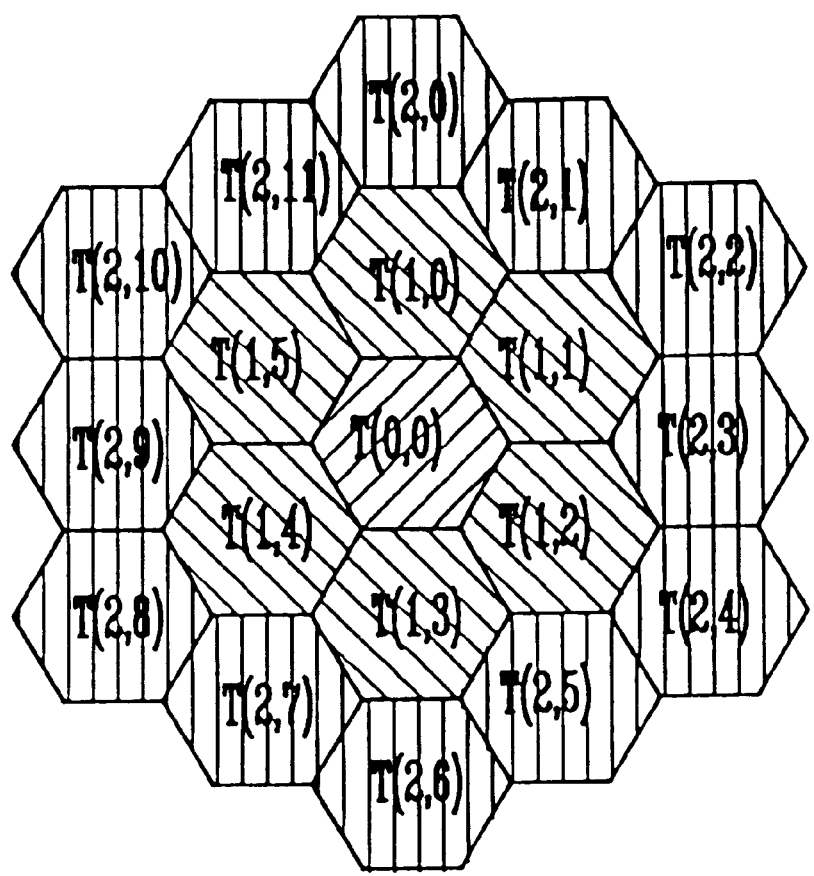
FIG. 2 is a configuration of multi-layer cell environment with a hierarchical structure.
Figure 2:
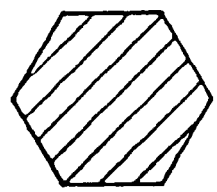
Figure 2:
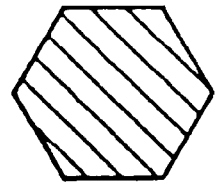
Figure 2:
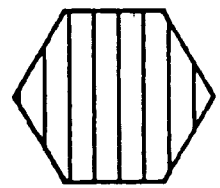

FIG. 2 shows a configuration of multi-layer cell environment with a hierarchical structure.

Referring to FIG. 2, the description of the configuration of multi-layer cell environment with the hierarchical structure is as follows:

In the figure, the level of the load imposed on cells is indicated. The cell located in the centermost indicates that it is currently in the condition of overload, multi-cell environments in the right side illustrates an example which retrieves a cell with minimum load around the overloaded cell to expand the cell with minimum load through the forward power control and then handoffs a call in the vicinity of a neighboring cell among calls in the overloaded cell.

A multi-cell configuration is composed of 3 layers. A first layer represents a cell in the overload condition. A second layer includes neighboring cells around the overload cell and 6 cells in a standard cell structure.

A third layer includes adjacent cell groups around the neighboring cell.

FIGS. 3A and 3B show an exemplary views for explaining the control of relationship between the overload cell and minimum load cell.

Referring to FIGS. 3A and 3B, the exemplary control of relationship between the overload cell and the minimum load cell may be described as follows:

When a particular cell is detected to be in the overload condition, a cell group with the condition of minimum load of adjacent cells with neighboring cells around the overload cell in the center is retrieved and then a cell radius of the cell group found as a result of the retrieval is expanded using the forward power control of the corresponding central cell so that subscriber call within the overload cell in the vicinity of the neighboring cell in handed off to the expanded cell.

The retrieval for selecting the cell group with minimum load among the neighboring cell groups of the overload cell is represented as the following expression.

$$T/C_{[1,0]} \rightarrow \left(\sum_{i=0}^{5} T_{(2,i)} \in C_{[1,0]}\right) + C_{[1,0]} =$$

$$(34 + 35 + 46 + 88 + 36 + 33 + 44) = 316$$

$$T/C_{[1,1]} \rightarrow \left(\sum_{i=0}^{5} T_{(2,i)} \in C_{[1,1]}\right) + C_{[1,1]} =$$

$$(35 + 33 + 40 + 52 + 88 + 44 + 46) = 338$$

$$T/C_{[1,2]} \rightarrow \left(\sum_{i=0}^{5} T_{(2,i)} \in C_{[1,2]}\right) + C_{[1,2]} =$$

$$(46 + 40 + 41 + 43 + 50 + 88 + 52) = 360$$

$$T/C_{[1,3]} \rightarrow \left(\sum_{i=0}^{5} T_{(2,i)} \in C_{[1,3]}\right) + C_{[1,3]} =$$

$$(88 + 52 + 43 + 39 + 32 + 38 + 50) = 342$$

$$T/C_{[1,4]} \rightarrow \left(\sum_{i=0}^{5} T_{(2,i)} \in C_{[1,4]}\right) + C_{[1,4]} =$$

$$(36 + 88 + 50 + 32 + 40 + 35 + 38) = 319$$

-continued $$T/C_{[1,5]} \rightarrow \left(\sum_{i=0}^{5} T_{(2,i)} \in C_{[1,5]}\right) + C_{[1,5]} =$$

$$(33 + 44 + 88 + 38 + 35 + 43 + 36) = 317$$

where, T represents the level of load and C indicates cells $T/C_{[i,j]}$ represents the level of load in cell (i, j)

$$\sum_{i=0}^{5} T_{(2,1)} \in C_{[1,5]}$$

is the level of load in 6 cells around cell (1,5).

When the load of the cell in the first layer is detected to have level 88 to be considered as an overload cell, a cell group with 6 cells of the second layer in the center are formed and a certain cell group with minimum load among the cell groups is retrieved.

In other words, the sum of the load of adjacent cells around C(1,0) cell (the load level of 44) as the neighboring cell of the overload cell is calculated (316).

Also, the sum of the load for the neighboring cells with C(1,1) cell (with the load level of 46) in the center is calculated (338).

In this manner, the sum of the cell group for the other cells is calculated.

Accordingly, it is appreciated that the cell group with minimum load is C(1,0) cell with the load level of 316.

FIG. 4 shows a flowchart for controlling the overload in the overload cell.

Referring to FIG. 4, the description concerning the control in the overload cell will be given hereinafter, At first, at step 111, when it is determined that a particular cell amounts to the overload condition in accordance with the decision of an overload detection module in the base station controller, the information on the overload cell is inputted from the overload detection module.

At step 112, the information on the load of the neighboring cells in the second layer around the overload cell as the first layer is retrieved.

At step 113, the information on the load retrieved at the step 112 is accumulated.

At step 120, it is determined whether a total load of the neighboring cells in the second layer is greater than a maximum value or not.

At this step (S120), if it is determined that the total load of the neighboring cells in the second layer is not greater than the maximum value at this step (S120), the overload detection module is notified that control is impossible and the procedure is terminated.

On the contrary, at this step (S120), if it is determined that the total load of the neighboring cells in the second layer is greater than the maximum, one among the cells in the second layer is selected.

At step 132, the information on the load of the cell in the third layer around the selected cell in the second layer is retrieved.

At step 133, the information on the load retrieved is summed.

At step 13, it is determined whether the operation of summing the load for the cell group in the third layer has been completed.

If it is determined that the operation of summing the load has been completed at this step (S134), the cell group with minimum load is selected at step 135.

At step 136, upon receiving the retrieval result of the cell group with minimum load with respect to the cell group in the third layer belonging to the neighboring cells in the second layer, a forward power control of the minimum load cell in the second layer selected is carried out.

At step 137, a service region is expanded by increasing the forward power so that a radius of cell is enlarged.

Accordingly, at step 138, a moving subscriber call in the vicinity of the neighboring cell of the overload cell is handed off to the expanded cell to thereby reduce the load of the overload cell.

As apparent from the detailed description so far, this invention has an advantage in that, when an insistent call service for moving subscribers due to the condition of overload in a certain cell can be provided, a call service for the moving subscribers at the boundary of the overload cell and a service for a new call can be maintained by selecting a cell group with minimum load among cell groups with neighboring cells around the overload cell in the center to enlarge a radius of the cell with minimum load so that a service region is expanded.

Therefore, since a capacity of call which can be processed in a radio communication network is increased, an improvement of system performance and a high reliability of CMS mobile system can be accomplished.

This invention will be applicable to the realization of personal mobile communication.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method for controlling an overload cell when a particular cell is overloaded in a CDMA mobile system, said method comprising the steps of:

a first step of receiving information on the overload cell from an overload detection module within a base station controller to retrieve the information on the load of neighboring cells and calculate the information on the total overload of said neighboring cells;

a second step of comparing the pre-defined total overload of said neighboring cells with a total load of said neighboring cells;

a third step of informing the overload detection module of the impossibility of control when it is determined that the total overload of said neighboring cells is not greater than the total load of said neighboring cells;

a fourth step of retrieving a cell group having a minimum load when at the second step it is determined as a result of the comparison that the total overload of the neighboring cell in the second hierarchy is less than the total load of said neighboring cells; and a fifth step of increasing forward power of the cell having the minimum load to expand a service region and handing off a moving subscriber call in the vicinity of said neighboring cells of the overload cell to the expanded cell.

2. The method as set forth in claim 1, wherein said first step comprises the sub-steps of:

determining by said overload detection module within the base station controller when a load of a particular cell has a value greater than 50% of the overload;

proceeding to said step of determining if it is determined that the particular cell does not amount to the overload value;

receiving information on the overload cell from said overload detection module if it is determined that the particular cell has the overload value;

retrieving the load information of said neighboring cells positioned around the said overload cell; and accumulating said load information on the load retrieved at said retrieving step.

3. The method as set forth in claim 1, wherein said third step comprises the sub-steps of:

selecting one of said neighboring cells positioned the overload cell;

retrieving the load information of other neighboring cells positioned around said selected neighboring cell;

summing said retrieved load information;

determining whether the operation of summing the load information has been completed;

proceeding to said step of selecting if it is determined that the operation of summing the load has not been completed; and selecting a cell group having a minimum load if it is determined that the operation of summing the load has been completed.

4. The method as set forth in claim 1, wherein said fifth step comprises the sub-steps of:

enlarging a radius of the cell having a minimum load to expand a service region; and handing off the moving subscriber call in the vicinity of said neighboring cells of the overload cell to the expanded cell.

5. The method as set forth in claim 1, wherein, in said step of enlarging the radius of the cell having a minimum load, the radius of the cell is enlarged by increasing the forward power of the cell having the minimum load.

* * * * *